United States Patent [19]

Kollmeyer

[11] 3,720,101

[45] March 13, 1973

[54] AUTOMATIC SPRING RATE PLOTTER

[75] Inventor: Herman R. Kollmeyer, Riverside, Calif.

[73] Assignee: The United States of America as represented by the Secretary of the Navy

[22] Filed: July 23, 1971

[21] Appl. No.: 165,594

[52] U.S. Cl. .................................................73/161
[51] Int. Cl. ...............................................G01l 1/04
[58] Field of Search................................73/161, 100

[56] References Cited

UNITED STATES PATENTS 3,285,065   11/1966   Ragen .....................................73/161

Primary Examiner—Louis R. Prince
Assistant Examiner—Denis E. Corr
Attorney—R. S. Sciascia et al.

[57] ABSTRACT

Apparatus for automatically measuring and plotting the force-deflection curve of springs, especially small springs on which forces are to be applied in order of 0.1 to 100 grams.

7 Claims, 2 Drawing Figures

PATENTED MAR 13 1973 3,720,101

INVENTOR.
HERMAN R. KOLLMEYER
BY

AUTOMATIC SPRING RATE PLOTTER

BACKGROUND

This invention relates to test apparatus, designed primarily for measuring and recording the spring rate curve for springs, but it is to be understood that it can be used for any purpose for which it is found applicable.

There are numerous devices employed in the prior art for determining the force-deflection curves for springs. The term frequently used is the spring rate, that is, the force required to initially extend or compress the spring, depending on whether the spring is a tension or a compression type.

The most conventional technique is the use of a spring scale and a distance measuring device, such as a dial indicator. The numerical data for the curve is recorded, and the curve is plotted by hand. This is a slow and time consuming procedure, especially where a large supply of springs are to be tested. In addition both the spring scale and the dial indicator used in the testing are non-linear and contain varying frictional forces which are difficult to measure, to eliminate, or to account for. Any commercially available equipment that will provide a direct force-distance curve is very complex and expensive.

SUMMARY OF THE INVENTION

A simple and inexpensive apparatus is devised to electronically measure and record the spring rate curve for springs. Each spring to be tested is positioned between two beams each instrumented with strain gauges which are connected electrically to an $x-y$ recorder through carrier amplifiers. The entire system produces a linear signal which simplifies calibration of the apparatus.

STATEMENT OF OBJECTS

The principal object of this invention is to provide a simple, inexpensive and expedient apparatus for measuring and recording the spring rate curve for springs.

Other objects, advantages and novel features of the invention will become apparent from the following detailed description of the invention when considered in conjunction with the accompanying drawings.

DESCRIPTION OF PREFERRED EMBODIMENT

Figure 1:
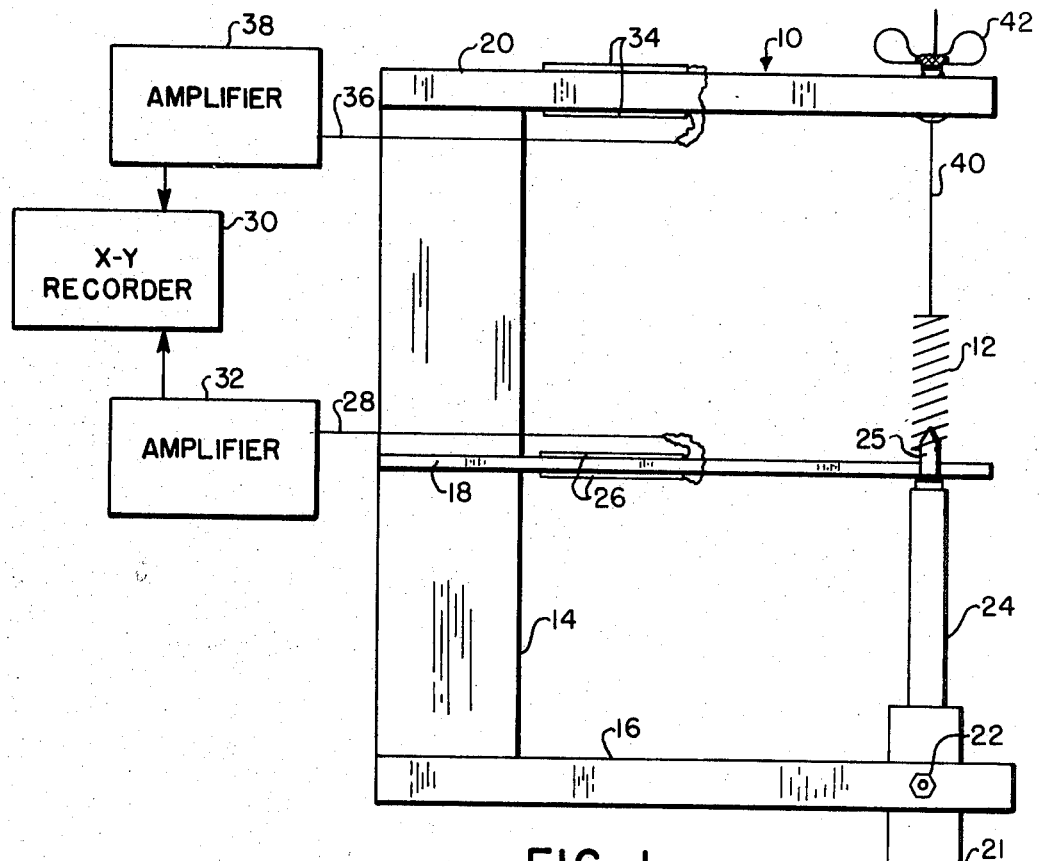
FIG. 1 is a side elevation of the novel apparatus with a test spring mounted in position to be measured for force and deflection.

Referring to the drawings where like reference numerals refer to similar parts throughout the figures there is shown in FIG. 1 the invention apparatus 10 for testing a sample spring 12. Apparatus 10 includes a rigid upright member 14 which can be suitably supported on a workbench or the like (not shown). Mounted to upright member 14 are the ends of a plurality of vertically spaced beams 16, 18 and 20 extending horizontally in the form of cantilevers.

Beam 16 is the lowest beam and provides a rigid support for a conventional micrometer 19 the head 21 being pinned at 22 or otherwise secured thereto. Movable spindle 24 projects upwardly and is secured to intermediate beam 18 at 25 for purposes of calibration thereof and for applying a force to the sample spring 12, as will be described later.

Intermediate beam 18 is referred to as the "deflection" beam as it is designed to measure the distance that the sample spring 12 is changed in length by manipulation of micrometer 19. This measurement is accomplished electronically by mounting two pairs of strain gauges 26, such as are commercially available "Baldwin SR4," two of the strain gauges being positioned on the top side of the beam, and two positioned on the underside of the beam, and all suitably connected electrically in a conventional bridge configuration. Strain gauges 26 are connected by electrical conductors 28 to the x axis of a conventional x-y recorder 30 through a variable amplifier 32.

The gain of amplifier 32 can be adjusted to provide the desired magnitude of beam deflection signal on the recorder in the x-axis, as may be suitable for each different spring tested.

Upper beam 20 is referred to as the "force" beam as it is designed to measure the force being applied by apparatus 10 to the sample spring 12. Similar to "deflection" beam 18, "force" beam 20 has mounted thereon two pair of strain guages 34 which are connected electrically by conductors 36 to $x-y$ recorder 30 through its variable amplifier 38. Strain gauges 34 are connected to the $y$ axis of recorder 30.

It should be noted that "force" beam 20 is comparatively thick (with respect to beam 18) which results in its deflection being in microinches for a force of 100 grams; therefore its deflection is so small that it can be neglected in the deflection measurement of spring 12. On the other hand, "deflection" beam 18 is relatively thin and with respect to beam 20 deflects readily to 0.250 in. or more at its outer end without taking a permanent set so that for all practical purposes beam 18 measures the total deflection occuring.

OPERATION

The initial step in testing a particular spring, or series thereof, is to conduct a calibration procedure. Assume spring 12 to be tested is a tension-type spring and is designed to have an initial tension of 15 grams. Obviously, the purpose of this test apparatus is to determine the loss of initial tension force, if any that has occurred in the manufacturing process such as in the annealing step, and if the spring falls within acceptable tolerances.

Calibration is conducted by first placing a certified 20 gram weight on "force" beam 20 and adjusting the gain of amplifier 38 to give a corresponding deflection amplitude, i.e., four inches in the y axis of recorder 30. Obviously, the weights and amplifier gains must be selected to obtain an appropriate scale range for each spring having a different load rate.

The "deflection" beam 18 is calibrated by use of micrometer 19. The gain of amplifier 32 is adjusted to give five thousanths of an inch beam deflection per inch of $x$ axis recorder deflection. Similarly, the scale can be selected to obtain an appropriate deflection range for any other spring being tested.

Upon completion of the calibration procedure, test spring 12 is then mounted between the "force" and "deflection" beams 20 and 18, respectively, using a suitable holding fixture. Being a tension-type spring the upper end of the spring is attached to a piece of piano wire 40 which passes through beam 20 and is adjustably secured together by a clamp 42.

Figure 2:
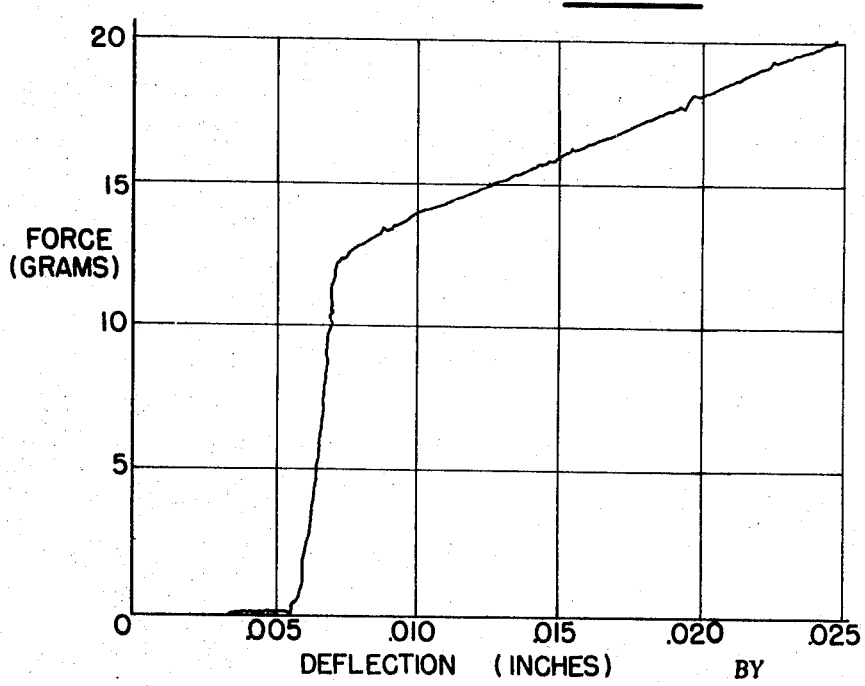
FIG. 2 is a representative chart produced by the $x-y$ recorder of a sample spring tested.

The test procedure is obvious by reference to both FIGS. 1 and 2. FIG. 2 is an actual force-deflection curve plot of the above described test spring 12 with a designed initial tension of 15 grams, the curve being plotted by the x–y recorder 30. The ordinate or y axis, of the recorder 30 being connected to "force" beam 20, measures and records the amount of force being applied by the spring. The abscissa or x axis, being connected to "deflection" beam 18, measures and records the amount of deflection of the spring.

As the plot in FIG. 2 clearly shows, the first .002th inch deflection is utilized to take up the slack in the spring system with a minute amount of force being applied to "force" beam 20 via spring 12. Thereafter the force exerted by the spring increases rapidly compared to the increase in deflection. This phenomena called in the trade the "initial tension" is produced in extension springs by twisting the wire during winding. The wires are actually held against each other with a twisting force established during the winding process. When the initial tension has been broken, i.e., a space between the coils, the spring has a new linear rate calculated by the standard deflection formula. The change from one rate to the other is gradual in most springs since all coils do not open simultaneously. This gradual changeover results in the knee of the curve. At this knee point the initial tension of the spring is determined. For the spring in FIG. 2 the initial tension is 12 grams.

The invention can provide automatically a documented force-deflection plot of a spring under test in a simple and expeditious manner. The apparatus is inexpensive to construct and to operate and will provide a permanent record. The testing system uses components all of which produce a linear signal and this simplifies the calibration of the apparatus. Simple calibration and operation is particularly important when many different types of springs are to be tested.

Obviously many modifications and variations of the present invention are possible in the light of the above teachings. It is therefore to be understood that within the scope of the appended claims the invention may be practiced otherwise than as specifically described.

What is claimed is:

1. In an apparatus for measuring a force exerted by a test article comprising:
   a substantially rigid beam;
   a flexible beam spaced from said rigid beam;
   each of said beams having a fixed end and a free end;
   means for rigidly supporting only the fixed ends of said beams;
   means for connecting said test article between the free ends of said rigid beam and said flexible beam whereby movement of said flexible beam applies a force on said rigid beam through said test article;
   means for measuring the force exerted on said rigid beam; and,
   means for measuring the deflection travelled by said flexible beam.

2. In an apparatus for measuring a force exerted by a test article comprising:
   a substantially rigid beam;
   a movable beam supported in spaced parallel relation to said rigid beam and being relatively flexible as compared with the rigid beam;
   means for connecting said test article between said beams whereby movement of said movable beam applies a force on said rigid beam through said test article;
   screw means for applying a force to said test article through said beams;
   means for measuring the force exerted on said rigid beam; and,
   means for measuring the deflection travelled by said movable beam.

3. The apparatus of claim 2 wherein said screw means is a micrometer, and a third beam is provided for supporting said micrometer.

4. The apparatus of claim 2 wherein strain gauges are provided on each beam for measuring their respective movement.

5. The apparatus of claim 4 wherein said strain gauges are connected in an electrical circuit including an x–y recorder, whereby the force and displacement exerted on said test article is automatically plotted.

6. The apparatus of claim 5 wherein Variable amplifier units are connected in each strain gauge circuit for calibration purposes.

7. In an apparatus for measuring the force exerted by a spring comprising:
   a first substantially rigid beam;
   a second beam laterally spaced from said first beam to receive therebetween the spring to be tested, said second beam being relatively flexible as compared to the first beam;
   a strain gauge attached to each of said beams;
   each strain gauge connected in circuit including a variable amplifier for calibration purposes and an x–y recorder;
   means for connecting the ends of said spring to said beams; and,
   means for moving said second beam with respect to the first beam to enable the spring force to exert a force between said beams whereby the force and displacement can be plotted directly by the x–y recorder.

* * * * *